United States Patent [19]
Small et al.

[11] 3,920,398

[45] Nov. 18, 1975

[54] METHOD FOR CHROMATOGRAPHIC ANALYSIS OF ORGANIC ACIDS OR THEIR CARBOXYLATE SALTS

[75] Inventors: Hamish Small; Timothy S. Stevens, both of Midland, Mich.

[73] Assignee: The Dow Chemical Company, Midland, Mich.

[22] Filed: Aug. 6, 1973

[21] Appl. No.: 386,264

[52] U.S. Cl. .......... 23/230 R; 23/253 R; 73/61.1 C; 210/25; 210/31 C; 210/37; 210/284; 210/294; 260/413; 260/419; 260/526 R; 260/537 R; 260/540; 260/541; 260/542; 260/701

[51] Int. Cl.² .............. G01N 27/08; G01N 31/04; G01N 31/08

[58] Field of Search ........ 23/230 R, 253 R; 210/24, 210/25, 31 C, 37, 38, 284, 294; 127/9; 73/61.1 C

[56] References Cited
UNITED STATES PATENTS

| | | | |
|---|---|---|---|
| 2,617,766 | 11/1952 | Emmett | 210/25 |
| 2,711,995 | 6/1955 | Sard | 210/25 |
| 2,950,176 | 8/1960 | Thayer | 23/230 R |
| 3,686,117 | 8/1972 | Lauer | 210/31 C |

OTHER PUBLICATIONS

Chemical Abstracts, 70: 91101t, (1969).
Chemical Abstracts, 68: 9151m, (1968).
J. S. Fritz et al., Anal. Chem., 40(14), pp. 2115–2119, (1968).
R. C. Zerfing et al., Anal. Chem., 38(10), pp. 1312–1316, (1966).
G. W. Goodman et al., Talanta, Vol. 16, pp. 807–812, (1969).

*Primary Examiner*—Morris O. Wolk
*Assistant Examiner*—Sidney Marantz
*Attorney, Agent, or Firm*—Edward E. Schilling

[57] ABSTRACT

Apparatus and method for chromatographic quantitative analysis of a plurality of organic carboxylic acids or the carboxylate salts thereof in aqueous solution in the special circumstance wherein the said acids or salts occur substantially free of other ionic materials except for water soluble metal halide or hydroxide, or strong mineral acid. A sample of the solution is added to a first cation exchange resin bed in the silver ion form wherein any halide or hydroxide is precipitated and the sample is eluted therefrom with water to a second cation exchange resin bed in the hydrogen ion form wherein any carboxylate salts are converted to the free acids and the free acids present are chromatographically separated as elution with water proceeds. The effluent from the second column is directed to a conductivity cell where the separated ion species are quantitatively sensed as they pass through the cell.

7 Claims, 1 Drawing Figure

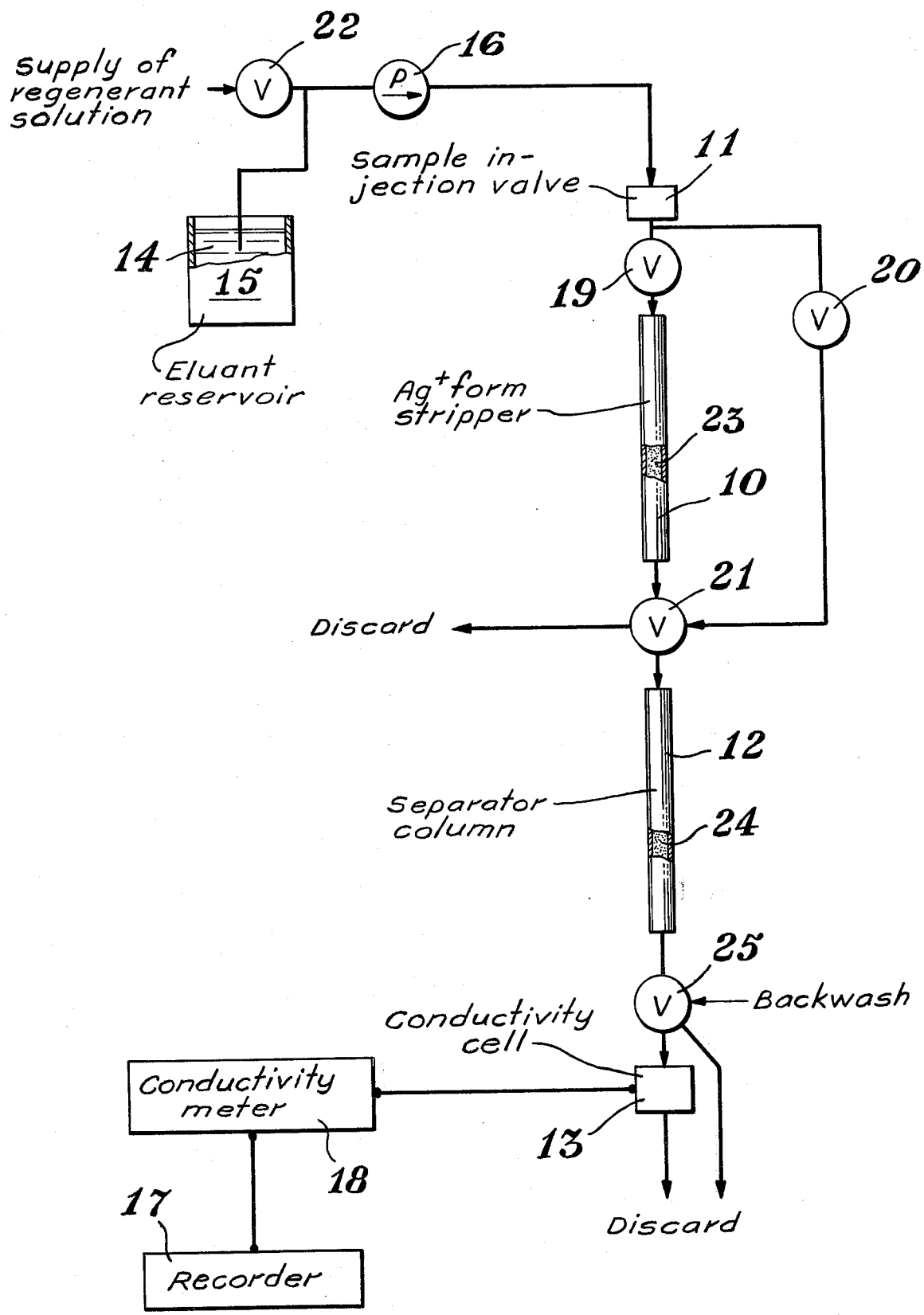

METHOD FOR CHROMATOGRAPHIC ANALYSIS OF ORGANIC ACIDS OR THEIR CARBOXYLATE SALTS

CROSS REFERENCE TO RELATED APPLICATIONS

In a copending application of Hamish Small and William C. Bauman, Ser. No. 386,260, filed even date herewith, there is described a method for chromatographic quantitative analysis of cationic species in solution wherein the solution is passed first through a separator ion exchange resin bed means and then through a stripper ion exchange resin bed means and then through a detector such as a conductivity cell and associated readout means. Chromatographic separation is carried out in the separator bed and in the stripper bed the developing reagent used in the eluant solution is acted upon by an ion exchange resin so that the developing reagent does not reach the detector in highly ionized form along with the separated ionic species being analyzed. For example, the developing reagent is converted to a weakly dissociated molecule such as water or is captured on ion exchange sites.

In a copending application of Timothy S. Stevens, Ser. No. 386,262, filed even date herewith, there is described a method for chromatographic quantitative analysis of cationic species in solution, particularly the more tightly bound cations, wherein cationic species such as amines are maintained in stable ionic form wherein the eluant solution employed consists of a mixture of a metal ion capable of moving the more tightly bound cations off a cation exchange resin and sufficient hydronium ion to assure stabilization of ions such as protonated amines so that chromatographic separation is possible upon a separator cation exchange resin bed. Use of such mixed developing reagent as the eluant solution is made possible by the employment of two separate stripper anion exchange resin beds in series, the first bed containing an anion exchange resin in a form suitable for precipitation of the metal ion used in the developing reagent and the second bed containing an anion exchange resin in the hydroxide form whereby all of the hydronium ion utilized is neutralized before the solution of separated cations under determination exit from the third chromatographic column and are directed to a detector such as a conductivity cell.

In a copending application of Hamish Small and Timothy S. Stevens, Ser. No. 386,263 filed even date herewith, there is disclosed the determination of the total ionic content of an aqueous sample solution on utilizing ion exchange method in which the sample solution is added to a cation exchange resin in easily elutable cation form and the easily elutable cations displaced are eluted from the column with water, the effluent being passed to an anion exchange resin which is in easily elutable anionic form, usually the hydroxide form. In the latter column all the anionic species in the sample are exchanged for a single anion. The effluent from the second resin bed, consisting entirely of a single ion pair species, viz., the preselected cation and the preselected anion, in water solution, is passed through a conductivity cell. Readout means associated with the conductivity cell indicate the number of equivalents of the single ion pair species corresponding to the number of equivalents of ionically dissociated compounds in the predetermined volume of sample solution.

In another copending application of Timothy S. Stevens and Hamish Small, Ser. No. 386,261, filed even date herewith, there is described a chromatographic method and apparatus for separating and quantitatively detecting more tightly bound cations such as the alkaline earth metal ions. The sample is placed on a cation exchange resin and eluted with a solution of either silver nitrate or barium chloride to achieve ion separation, after which the silver ion or barium ion is stripped with an anion exchange resin in the chloride or sulfate form, respectively, and the effluent from the stripper resin substantially free of eluant background is directed to a conductivity cell having associated readout means whereby the cation concentrations are quantified.

In an additional copending application of Timothy S. Stevens and Hamish Small Ser. No. 386,265, filed even date herewith, there is described apparatus and method for rapidly and accurately quantitatively measuring the quantity of a given ion in aqueous solution in the presence of a plurality of countervalent ions, using ion exchange techniques and a conductivity cell as detector.

BACKGROUND OF THE INVENTION

1. Field of the Invention

The invention relates to method and apparatus for quantitative chromatographic analysis of a mixture of organic carboxylic acids or their carboxylate salts in aqueous sample solution. The invention more particularly relates to chromatographic quantitative analysis of a mixture of organic carboxylic acids or their carboxylate salts in admixture in aqueous solution with ionic materials such as alkali metal halide and/or hydroxide in a process utilizing a conductivity cell for the quantitative detection of each species of organic carboxylic acid.

2. Description of the Prior Art

Heretofore mixtures of organic carboxylic acids or their carboxylate salts have been analyzed by sophisticated apparatus such as infra-red, mass spectrometer or, with the gas chromatograph in the case of the free acids of sufficient volatility. However, the sophisticated apparatus is not well adapted to handle an aqueous solution and the carboxylate salts, especially the metal salts, are not volatile enough to get through a gas chromatrograph column.

On the other hand, chromatographic separations of solutions of the organic acids and their salts have been made but, so far as is known, no attempt has been made to follow their sequential exit from a chromatographic column with a single commmon detector that is simple and rugged and readily automated and capable of quantitatively detecting each of the organic acids in turn. In particular, no such method has been contemplated that is capable of separating and quantitatively detecting such organic acids or their salts when present in an aqueous sample solution along with a significant or major amount of water soluble metal halid and/or hydroxide and/or strong mineral acid.

SUMMARY OF THE INVENTION

It has now been discovered that chromatographic quantitative analysis of a plurality of organic carboxylic acids or the carboxylate salts thereof in admixture with any of strong mineral acid, or, soluble metal halide or soluble metal hydroxide, e.g., alkali metal halide or hydroxide, alkaline earth metal halide or hydroxide, in aqueous solution is readily and expeditiously carried out upon adding a predetermined amount of the sample solution to a first cation exchange resin bed means, the resin bed means being charged with a cation exchange resin in the silver ion form, and eluted therefrom with water to a second cation exchange resin bed means, the resin bed means being charged with a cation exchange resin in the hydrogen ion form and chromatographically separating the plurality of organic carboxylic acids or carboxylate salts thereon, the carboxylate salts also being converted to free acids, and directing the effluent from the second resin bed means to a conductivity cell having associated readout means.

Sample solution substantially free of ionic materials other than the organic carboxylic acids or their carboxylate salts or non-interfering materials such as strong mineral acid or water soluble metal hydroxide need not be passed through the silver form column before separation on the second resin bed.

Apparatus used according to the invention includes a reservoir or other source of supply of water for use as eluant, a pump, a sample injection valve, a first chromatographic column charged with a cation exchange resin in the silver ion form, a second chromatographic column charged with a cation exchange resin in the hydrogen ion form and a conductivity cell, each connected in series by means of liquid conduit means. The conductivity cell is provided with associated readout means including a conductivity meter and a recorder. In apparatus for the analysis of aqueous solution of organic carboxylic acids or carboxylate salts thereof substantially free of interfering ionic materials, the first chromatographic column charged with silver form resin is simply omitted, or by-passed.

BRIEF DESCRIPTION OF THE DRAWING

The single FIGURE of the drawing is a schematic representation of a combination of parts for carrying out chromatographic separation and quantitative analysis including a separator column charged with an ion exchange resin for the chromatographic separation of the ions of interest with or without an additional column charged with ion exchange resin being used to remove interfering ionic substances by ion exchange methods, prior to chromatographic separation, the effluent from the separator column being directed to a conductivity cell which serves as detector.

FURTHER DESCRIPTION OF THE INVENTION

The present method and apparatus are well adapted for the rapid and automated analysis of a mixture of organic carboxylic acids or the carboyxlate salts thereof in aqueous solution containing up to the saturation limits of soluble metal halide and/or soluble metal hydroxide and/or strong, i.e., highly dissociated, mineral acid. The carboxyllic acids and/or carboxylate salts determinable include any of such compounds soluble enough to be present in the sample solution at a concentration at least equal to the detection limit of the conductivity cell, usually below about 1 part per million of carboxylic acid or carboxylate salt. The carboxylate salts referred to include the alkali metal salts, and any other sufficiently soluble metal salts, as well as organic salts.

The method is of advantage principally for the analysis of non-aromatic carboxylic acids and their carboxylate salts, including the monocarboxylic fatty acids having from 1 to 10 carbon atoms in the molecule and the di- and tri-carboxylic acids having up to 10 carbon atoms in the molecule as well as the corresponding hydroxy substituted acids.

The sufficiently water soluble aromatic carboxylic acids and carboxylates are readily determinable by the present method but other methods will ordinarily be preferred.

The carboxylic acids or their carboxylate salts are readily separated from soluble metal halides or hydrohalides which heretofore have represented an analytical problem preventing easy, rapid, low cost analysis. Analysis is carried out by the present method on passing the sample solution through a cation exchange resin in the silver ion from whereby the halide ions are precipitated as silver halide and the countervalent metal ions substantially all captured at the sites vacated by the silver ions. Sufficient such resin must be used to accomplish the removal of such halides from the sample solution, and preferably the exchange capacity is great enough for a plurality of samples before regeneration of the resin is required.

The sample is eluted through the silver ion form resin with water and is carried into the second cation exchange resin bed which is provided in the hydrogen ion form. In the second bed any carboxylate salts are converted to free acids and any metal hydroxides are neutralized by ion exchange action, and chromatographic separation of the organic acids present occurs as the sample moves down through this second resin bed.

Effluent from the second resin bed includes the concentration peaks or aggregations of the separated organic acids usually preceded by any strong mineral acids.

In the event the sample solution is free of interfering halides and contains only the carboxylic acids or carboxylates and no other ionic materials save for any soluble metal hydroxide or strong mineral acid, the sample need not be pre-treated by passage through the silver ion form cation exchange resin but can simply be separated and treated on the hydrogen ion form cation exchange resin which will effectively remove metal hydroxide from the solution and pass the mineral acid separately and ahead of the organic acids.

The mechanics of separation of the carboxylic acids and carboxylate salts on the cation exchange resin in the hydrogen ion form as used herein are known and can be manipulated to obtain specific separations or better resolution as well understood in the art, as by selection of column geometry, especially the length, the flow rate of the eluant liquid, and the nature of the resin used, especially the degree of sulfonation thereof.

In carrying out analysis of an aqueous solution of a mixture of carboxylic acids or carboxylate salts in the presence of other interfering ionic materials, such interfering ionic materials must be removed by some means. For example, sulfates are removable by the careful addition of barium thereby precipitating barium sulfate. Inorganic salts are generally removable by dialysis procedures. Wherein the other ionic materials consist essentially entirely of water soluble metal halide such as alkali metal halides and alkaline earth metal halides and/or hydrohalide such as hydrochloric or hydrobromic acid, the solution is readily freed of such halide compounds by eluting the sample through a cation exchange resin in the silver form and having sufficient total exchange capacity to precipitate all of the halide present as silver halide and to capture the alkali metal and/or alkaline earth metal ions or other soluble metal ions and any hydronium ions present at the ion exchange sites vacated by the silver ions. Water is used as the eluant liquid.

The cation exchange resin utilized in silver form for such removal of halide compounds may be any one of the commercially available high capacity cation exchange resins. These resins are typically polystyrene or modified polystyrene copolymers cross-linked, e.g., with divinylbenzene, and carrying nuclear groups, the latter providing the active exchange sites. The strong cation exchange resins carry nuclear sulfonic acid or sulfonate groups along the polymer chain, while the weak cation exchange resins usually carry carboxylate groups. Either strong or weak cation exchange resins may be used in the silver form herein, but the strong acid type ion exchange resins are preferred.

For further information on ion exchange theory, processes and resins synthesis, reference is made to the monograph "Dowex:Ion Exchange" 3rd Ed., 1964, published by the Dow Chemical Company, Midland, Mich., and the two volume work "Ionic Exchange" edited by Jacob A. Marinsky and published by Marcel Dekker Inc., New York, 1966. Chapter 6 Vol. 2, of "Ionic Exchange" is devoted to a description of synthesis of ion exchange resins of various types usable herein in the silver form.

Referring now to the single FIGURE of the drawing, the apparatus of the present invention is seen basically to consist of a first chromatographic column 10, a second chromatographic column 12, a conductivity cell 13 and liquid conduit means connecting these parts in series. Water 14 for elution is drawn from eluant reservoir 15 by a pump 16 and supplied to the column 10 via a sample injection valve 11 and control valve 19. The conductivity cell 13 is provided with readout means consisting of a conductivity meter 18 and a recorder 17, the latter preferably being a recorder-integrator.

In the event the first column is not used, as in the analysis of a sample solution substantially free of ionic materials other than the organic carboxylic acids or their carboxylate salts, the apparatus may be assembled without column 10 and valve 19, but in the case of the apparatus shown, valve 19 is closed to flow to the column 10 while valve 20 in the by-pass line is opened and multiport valve 21 is set to receive eluant flow from the by-pass line and direct it to the second column 12.

Column 10 is charged with a cation exchange resin 23 in the silver ion form. The cation exchange resin 23 is preferably a high specific capacity cation exchange resin and may be one of the generally available, commercially sold, cation exchange resins such as one of the polystyrene or modified polystyrene copolymers cross-linked, e.g., with divinylbenzene and carrying nuclear groups, the latter providing the active exchange sites in the form of nuclear sulfonic acid or sulfonate groups along the polymer chain.

The column 12 is charged with a cation exchange resin 24 in the hydrogen ion form. The resin 24 may be most any commercially available cation exchange resin but is preferably a low specific capacity resin, homogeneously sulfonated throughout the beads thereof and formed of a copolymer of styrene and divinylbenzene. Preferably the degree of sulfonation is 10 per cent or greaater of the sulfonatable sites on the copolymer.

For information on ion exchange theory, processes and resin synthesis reference is made to the monograph "Dowex: Ion Exchange" 3rd Ed., 1964, published by the Dow Chemical Company, Midland, Mich., and the two volume work "Ion Exchange" edited by Jacob A. Marinsky and published by Marcel Dekker Inc., New York 1966. Chapter 6, Vol. 2, of "Ion Exchange" is devoted to a description of synthesis of ion exchange resins of various types usable herein in the cation exchange resin beds.

In carrying out analysis of a mixture of carboxylic acids or carboxylate salts according to the present method, the aqueous sample solution is placed upon the chromatographic column 10 by any suitable means as by pipetting or otherwise placing a measured amount of solution on the column but preferably sample is added to the column by injecting a measured amount by means of the sample injection valve 11. The sample injection valve 11 is ordinarily one of the commercially available sample injection valves having a valve plug bore or a loop of tubing connecting to the valve body ports utilized to determine sample size which is subsequently swept out by the eluant as well understood in the art. While the chromatographic separation can be carried out by manually adding eluant water to the top of the open column, it is much preferred for the purposes of obtaining rapid, highly reproducible results that the eluant be added as a steady stream by the use of a pump such as pump 16. The carboxylic acids present in the sample solution entering the column 10 and passing over the silver ion form cation exchange resin therein do not become captured at ion exchange sites but the halide ions are precipitated as silver halide. In addition, the soluble metal ions, if present, are captured at the sites vacated by the silver ions. Strong mineral acids, save for hydrohalides, elute on through as do metal hydroxides if in alkaline solution.

The effluent from the first chromatographic column 10 passes to second chromatographic column 12 substantially freed from halides.

In passing over the cation exchange resin in the separator bed in column 12, the carboxylic acids are chromatographically separated and generally exit from the column 12 in well defined concentration peaks. If separation of a given pair of carboxylic acids is not readily achieved, variations can be made to achieve separation including increasing the amount of ion exchange resin as by further filling the column or by using a longer column, by decreasing the flow rate of eluant water or possibly by changing the concentration of the sample solution injected at the sample injection valve. Carboxylate ions, if present in the effluent from column, are converted to the free acids in column 12 by ion exchange action and are chromatographically separated.

The concentration peaks of carboxylic acids exiting from the chromatographic column 12 are emperically detected by the conductivity cell 13. Concentration is achieved by running known standards. The proportionality between concentration of carboxylate ion and conductivity cell response has been found to be substantially linear over a large range of concentration from the very dilute up to about 0.5 molar carboxylic acid.

The preferred ion exchange resin for separation of carboxylic acids according to the present invention is a homogeneously sulfonated copolymer of styrene and divinylbenzene having about 1 to 8 per cent by weight divinylbenzene in the copolymer and the balance substantially styrene. Sulfonation should be to the extent of at least about 10 per cent of the sulfonatable sites on the polymer chain. The resin beads are preferably of an average particle size in the range of about 200 to about 400 mesh (U.S. Sieve series) although finer sizes may be used if desired. In general, a coarser grade permits faster flow rates at a given applied pressure from the pump.

Using the preferred resin specified herein or an equivalent performing resin, sharp concentration peaks are obtained and conductivity cells having high sensitivity for the carboxylic acids, the lower molecular weight carboxylic acids such as acetic acid, glycolic acid and formic acid are detectable at concentration levels as low as about 0.1 parts per million (ppm.). Carboxylic acids such as butyric acid and valeric acid are detectable at concentration as low as about 1 ppm. while carboxylic acids having about 8 to 10 carbon atoms in the molecule are detectable at minimum concentrations in the range of about 10 to 100 ppm.

Sample portions added to the column by typical sample injection valve generally run in the range of about 0.002 to about 5 milliliters of dilute solution of carboxylic acids which in total are present in an amount commonly expressed in milliequivalents no greater than about 1 to 10
per cent of the ion exchange capacity of the separator bed, thus providing for a good resolution on the column. Flow rates of water for elution generally run in the range from about 20 to about 500 milliliters per hour wherein the chromatographic column utilized has a diameter in the range of about 2 to 10 millimeters internal diameter (I.D.).

It is to be understood that the separator bed containing the cation exchange resin in the hydrogen ion form occasionally requires regeneration to the hydrogen ion form and this is carried out as well understood in the art.

On the other hand, the cation exchange resin used in silver form, if necessary for the removal of halide ions, may become exhausted rather rapidly and must be periodically regenerated by passing through the column a material capable of dissolving and removing the precipitated silver halide. Regeneration is carried out by washing the resin with a solution of ammonium hydroxide followed by a solution of silver nitrate. It is more preferred, however, to remove the exhausted resin and replace it with fresh resin in the silver ion form.

The following examples serve to illustrate the use of the method and apparatus of the invention and the scope of the invention is not intended to be limited thereto.

EXAMPLE 1

A 9 × 260 mm. column was filled with 200–400 mesh size resin being a copolymer of about 2 per cent divinylbenzene, 98 per cent styrene, in which about 40 per cent of the aromatic rings were subsequently sulfonated. Samples were injected using a sample loop injection valve injecting about 100 μl of sample. The sample was eluted by a pumped stream of de-ionized water at a rate of 460 milliliters per hour (ml/hr). The effluent from the column was directed to a conductivity cell and readout means. Individual injections of various dilute solutions of carboxylic acids in de-ionized water were made and various elution times noted as follows:

| Carboxylic Acid | Elution Time in Min. |
|---|---|
| Formic acid | 3.5 |
| Glycolic acid | 3.5 |
| Acetic acid | 5.0 |
| Propionic acid | 6.5 |

-continued

| Carboxylic Acid | Elution Time in Min. |
|---|---|
| Butyric acid | 8.5 |
| Valeric acid | 14.0 |

In addition, a dilute mixture of 10 ppm. glycolic acid and 10 ppm. acetic acid in de-ionized water when injected and eluted showed conductivity peaks sharply separated for each component.

EXAMPLE 2

A 2.8 × 150 mm. column was filled with Dowex 50WX8 ion exchange resin in the silver ion form, 200–400 mesh size. The effluent of this column was directed to a 9 × 260 mm. column filled with the resin of Example 1. Samples were injected onto the 2.8 to 150 mm. column using a sample loop injection loop injection valve injecting about 100 μl of sample. The sample was eluted by a pumped stream of de-ionzed water at a rate of 460 ml/hr. The effluent from the 9 × 260 mm. column was directed to a conductivity cell and readout means. First known standard solutions of acetic and glycolic acids in de-ionized water were injected and the conductivity peak areas measured, then a 10:1 dilution of an unknown sample of a solution of acetic and glycolic acids in 25 per cent sodium chloride was injected and the conductivity peak areas measured. The data are as follows:

| Sample Injected | Peak Area |
|---|---|
| 12 ppm. acetic acid | 42.5 |
| 120 ppm. acetic acid | 300 |
| 10 ppm. glycolic acid | 40 |
| 100 ppm. glycolic acid | 410 |
| 1:10 Dilution of 25% NaCl brine unknown sample | Peak Area |
| Acetic acid peak | 86 |
| Glycolic acid peak | 115 |

An approximate proportionality was observed between the peak areas and the amounts of acids in the standard solutions injected. These proportionality factors were used to convert the peak areas of the unknown sample to concentrations and these results compared to the amount of glycolic and acetic acids later known to be present in the brine as follows:

Concentration of acetic acid by method described herein = 420 ppm.
Concentration of acetic acid known to be in sample = 400 ppm.
Concentration of glycolic acid by method described herein = 2800 ppm.
Concentration of glycolic acid known to be in sample = 2500 ppm.

What is claimed is:
1. The method of chromatographic quantitative analysis of a plurality of organic carboxylic acids or the carboxylate salts thereof present in aqueous sample solution substantially free ionic species other than said organic acids or salts thereof, water soluble metal halide, soluble metal hydroxide, or strong mineral acid, which comprises:
 adding a predetermined amount of said sample solution to a cation exchange resin bed means, said means being charged with a cation exchange resin in the silver form, and eluting said sample from said first cation exchange resin bed means with water thereby precipitating the halides present as silver halide and capturing, at the ion exchange sites, any countervalent soluble metal ions, and hydronium ions, passing the effluent from the first cation exchange resin bed means through a second cation exchange resin bed means, said second resin bed means being charged with a cation exchange resin in the acid form thereby bringing about chromatographic separation of the organic carboxylic acids or the respective carboxylic acids produced from said carboxylate salts;

and passing the effluent from second cation exchange resin bed means containing substantially only aqueous of carboxylic acids and any strong mineral acid through a conductivity cell having associated read-out means.

2. The method as in claim 1 in which the organic carboxylic acids or their carboxylate salts are non-aromatic compounds having no more than 10 carbon atoms in the molecule.

3. The method as in claim 2 in which the organic carboxylic acids or the carboxylate salts thereof include any of fatty acids, hydroxy fatty acids, dicarboxylic acids, hydroxy dicarboxylic acids, hydroxy tricarboxylic acids and the carboxylate salts of any such acids and mixtures thereof.

4. The method as in claim 1 in which the total concentration of organic carboxylic acids or their carboxylate salts present in the aqueous sample solution is below about 5 per cent by weight.

5. The method as in claim 1 in which at least one of the organic carboxylic acids or the carboxylate salts thereof is present in the aqueous sample solution at a concentration below about 0.1 per cent by weight.

6. The method as in claim 1 wherein the cation exchange resin is sulfonated copolymer of styrene and divinylbenzene containing about 1 to 8 per cent by weight divinylbenzene and the balance styrene and is homogeneously sulfonated throughout the resin at at least 10 per cent of the available sulfonable sites.

7. The method as in claim 1 wherein the cation exchange resin in the second resin bed means has a specific exchange capacity in the range about 0.005 to 0.5 milliequivalents per gram, the predetermined amount of sample solution being less than that which would overload said resin in said cation exchange resin bed means.

* * * * *

UNITED STATES PATENT AND TRADEMARK OFFICE
CERTIFICATE OF CORRECTION

PATENT NO. : 3,920,398

DATED : November 18, 1975

INVENTOR(S) : Hamish Small; Timothy S. Stevens

It is certified that error appears in the above-identified patent and that said Letters Patent are hereby corrected as shown below:

Column 2, line 45, "chromatrograph" should read --chromatograph--;

Column 2, line 50, "commmon" should read --common--;

Column 3, line 51, "carboyxlate" should read --carboxylate--;

Column 3, line 55, "carboxyllic" should read --carboxylic--;

Column 4, line 13, "from" should read --form--;

Column 5, line 19, "the" should read --The--;

Column 5, line 63, "greaater" should read --greater--;

Column 5, line 67, the first "the" should read --The--;

Column 6, line 47, after "column" insert --10--;

Column 7, line 21, after "10", line 22 should immediately follow starting with "per cent of the ion exchange";

Column 8, line 17, "to" should read --x--;

Column 8, line 18, "injection loop" should be deleted;

Column 8, line 20, "de-ionzed" should read --de-ionized--;

Column 8, line 62, after "free" insert --of--;

Column 9, line 16, after "ous" at the beginning of the sentence, insert --solution--.

Signed and Sealed this first Day of June 1976

[SEAL]

Attest:

RUTH C. MASON
Attesting Officer

C. MARSHALL DANN
Commissioner of Patents and Trademarks